April 21, 1925.                      1,534,731
J. PALLISCHECK
TRACTION SHOE FOR VEHICLE WHEELS
Filed Aug. 25, 1924
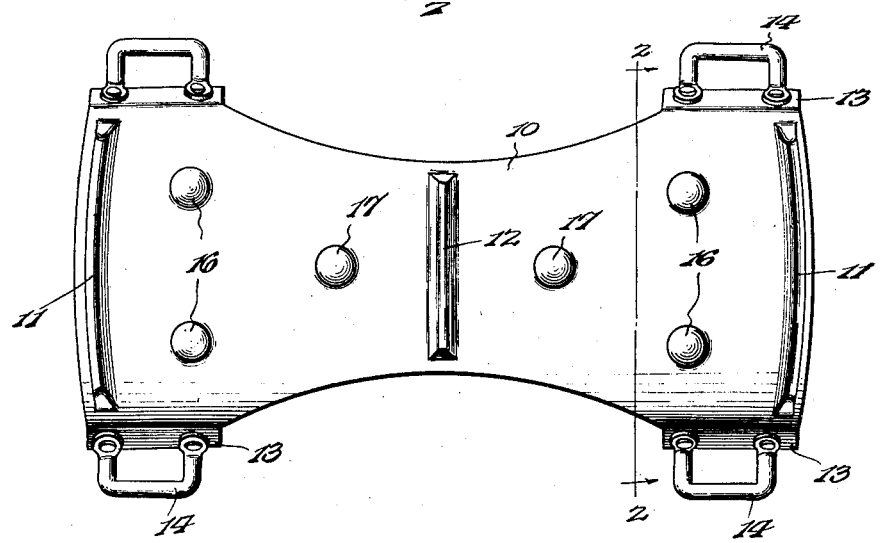
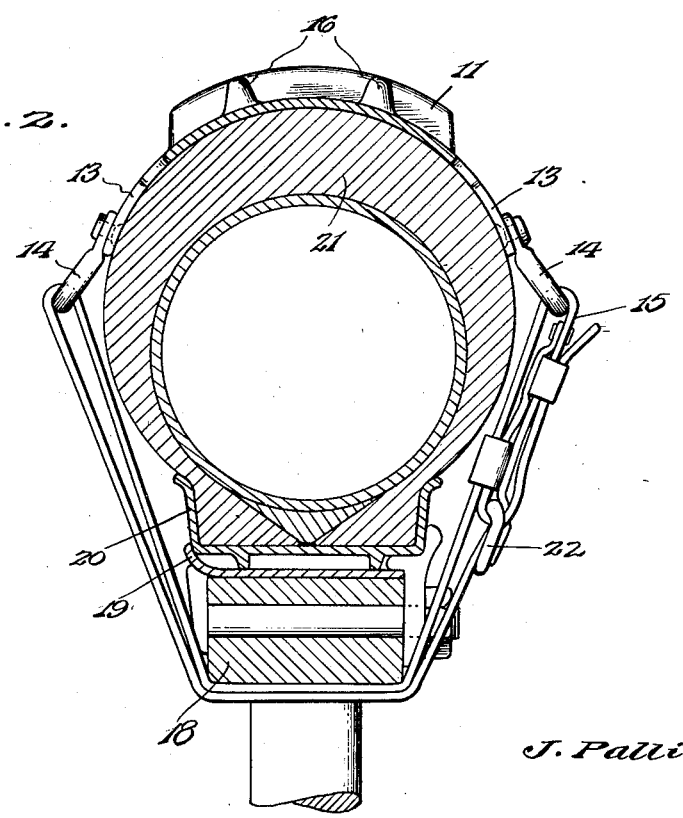
Inventor
J. Pallischeck.
By
Lacey & Lacey, Attorneys Patented Apr. 21, 1925.

1,534,731

UNITED STATES PATENT OFFICE.

JOSEPH PALLISCHECK, OF MUSCATINE, IOWA.

TRACTION SHOE FOR VEHICLE WHEELS.

Application filed August 25, 1924. Serial No. 734,016.

*To all whom it may concern:*

Be it known that I, JOSEPH PALLISCHECK, a citizen of the United States, residing at Muscatine, in the county of Muscatine and State of Iowa, have invented certain new and useful Improvements in Traction Shoes for Vehicle Wheels, of which the following is a specification.

This invention relates to an improved traction shoe for motor vehicles and seeks, among other objects, to provide a device of this character which may be readily applied over the tires of the rear wheels of a vehicle and which will afford sure traction for the wheels to prevent spinning thereof as well as skidding.

The invention seeks, as a further object, to provide a shoe embodying integral transverse traction ribs which may be sharpened from time to time, as occasion may demand, and also embodying a plurality of traction knobs or calks between the ribs to prevent side slipping.

And the invention seeks, as a still further object, to provide a device which may be readily attached or removed and which, in practical use, will not be easily subject to fracture or breakage.

Other and incidental objects will appear hereinafter.

In the accompanying drawings:

Figure 1 is a plan view of my improved traction shoe, the attaching straps of the shoe not being illustrated, and Figure 2 is a sectional view on the line 2—2 of Figure 1, looking in the direction indicated by the arrows.

In carrying the invention into effect, I employ an oblong plate 10 reduced medially on like arcuate lines so that the ends of the plate are somewhat wider than the middle portion thereof. The plate may be constructed of steel or may be cast and integrally formed on the plate immediately adjacent the end edges thereof are upstanding transverse traction ribs 11, while at a point midway between said ribs, the plate is similarly provided with a like transverse traction rib 12, which, however, is somewhat shorter than the ribs 11. The rib 12 will thus reinforce the plate at its narrowest point and, preferably, all of said ribs are gradually tapered toward their upper longitudinal edges so as to readily sink into the roadway.

Formed on the plate 10 at its ends are depending rectangular ears 13 and fixed to said ears are pairs of loops 14 which are preferably riveted to the ears. Associated with each pair of loops is, as seen in Figure 2 of the drawings, a leather attaching strap 15. Rising from the end portions of the plate 10, substantially in alinement with the rear ends of the loops 14, are pairs of transversely spaced traction knobs 16 and rising from the plate adjacent opposite sides of the rib 12 are like traction knobs 17 lying in a plane passing midway between the pairs of knobs 16. All of said knobs are integral with the plate and are of conical formation.

In Figure 2 of the drawings, I have shown my improved shoe applied. The felly of a conventional motor vehicle wheel is indicated at 18, the felly band at 19, the rim at 20 and the tire at 21. As illustrated, the plate 10 is curved longitudinally to conform to the circumferential curvature of the tire and is also curved transversely to conform to the transverse curvature of the tire, so that the plate thus fits flat against the tire overlying the tread thereof. The straps 15 are preferably connected with corresponding loops 14 at one side edge of the plate, by suitable keepers, and it is now to be observed that the loops extend at a slight angle with respect to the ears 13 to provide clearance between the loops and the sides of the tire. Accordingly, after the shoe has been positioned upon the tire, the straps may be disposed to extend beneath the felly 18 of the wheel and the free ends of the straps freely passed through opposite corresponding loops of the shoe and secured by means of the strap buckles 22 for securely connecting the shoe with the wheel. Thus, the device may be easily applied and, as will be appreciated, the ribs 11 and 12 and the knobs 16 and 17 of the shoe will provide sure traction for the wheel. Furthermore, when the knobs and ribs become dulled, they may be built up or sharpened at any blacksmith shop so that the device may, accordingly, be economically maintained to function efficiently. As will be understood each wheel of a vehicle may, of course, be equipped with any approved number of the devices arranged at spaced points circumferentially of the wheel.

Having thus described the invention, what I claim is:

In a traction shoe for vehicle wheels, the combination of an oblong longitudinally and transversely curved plate reduced medially and provided at its ends with depending ears projecting from the side edges of the plate, substantially U-shaped loops having spaced sides fixed at their ends to said ears, longitudinally curved upstanding traction ribs formed on the plate near its ends and extending transversely of the plate substantially in alinement with corresponding sides of said loops, a straight integral transverse upstanding traction rib formed on the plate substantially midway between the former ribs and reinforcing the reduced central portion of the plate, pairs of transversely spaced upstanding knobs formed on the end portions of the plate between said ribs and substantially alining with the opposite corresponding sides of said loops, and like knobs formed on the plate immediately adjacent opposite sides of said last mentioned ribs and lying in a plane passing midway between said pairs of knobs.

In testimony whereof I affix my signature.

JOSEPH PALLISCHECK. [L. S.]